United States Patent
Xie et al.

(10) Patent No.: US 11,476,670 B2
(45) Date of Patent: Oct. 18, 2022

(54) SYSTEM-LEVEL PROTECTION SYSTEM AND METHOD FOR SUB/SUPER-SYNCHRONOUS RESONANCE/OSCILLATION

(71) Applicant: Tsinghua University, Beijing (CN)

(72) Inventors: Xiaorong Xie, Beijing (CN); Wei Liu, Beijing (CN); Ningning Ma, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 453 days.

(21) Appl. No.: 16/701,305

(22) Filed: Dec. 3, 2019

(65) Prior Publication Data

US 2020/0106263 A1 Apr. 2, 2020

Related U.S. Application Data (63) Continuation of application No. PCT/CN2018/094238, filed on Jul. 3, 2018.

(30) Foreign Application Priority Data

Nov. 9, 2017 (CN) .......................... 201711108495.X (51) Int. Cl.
*H02J 3/24* (2006.01)
*H02J 3/01* (2006.01)
(Continued)

(52) U.S. Cl.
CPC .............. *H02J 3/01* (2013.01); *G05B 17/02* (2013.01); *H02H 1/0092* (2013.01);
(Continued)

(58) Field of Classification Search
CPC ........ H02J 3/24; H02J 3/40; H02J 3/01; H02J 3/242; H02J 3/46; H02J 2300/28;
(Continued)

(56) References Cited

U.S. PATENT DOCUMENTS

2014/0100702 A1* 4/2014 Schweitzer, III ... H02J 13/0079
700/286

FOREIGN PATENT DOCUMENTS

CN 105470970 A * 4/2016
CN 106021682 10/2016
(Continued)

OTHER PUBLICATIONS

WIPO, ISR for PCT/CN2018/094238, Aug. 21, 2018.
SIPO, First Office Action for CN Application No. 201711108495.X, dated Oct. 22, 2018.

*Primary Examiner* — Harry R Behm
(74) *Attorney, Agent, or Firm* — Hodgson Russ LLP (57) ABSTRACT

The present disclosure provides a system-level protection system and method for sub/super-synchronous resonance/oscillation. The system includes a centralized protection coordinator arranged in a control center and a plurality of distributed protection relays arranged in a plurality of transformer substations or wind farms. Each distributed protection relay is configured to acquire a sub/super-synchronous impedance of the wind farm. The centralized protection coordinator is configured to acquire the sub/super-synchronous impedances measured by the plurality of distributed protection relays, to obtain a sub/super-synchronous aggregate impedance of the system according to a preset circuit topology and the sub/super-synchronous impedances, and to generate a system-level protection signal when the sub/super-synchronous aggregate impedance does not meet a stable condition. Each distributed protection relay is further configured to initiate a system-level protection according to the system-level protection signal.

10 Claims, 3 Drawing Sheets

(51) Int. Cl.
*G05B 17/02* (2006.01)
*H02H 1/00* (2006.01)
*H02H 7/26* (2006.01)
*H02J 3/40* (2006.01)
*H02J 3/46* (2006.01)
*H02J 3/38* (2006.01)

(52) U.S. Cl.
CPC .............. *H02H 7/263* (2013.01); *H02J 3/242* (2020.01); *H02J 3/381* (2013.01); *H02J 3/40* (2013.01); *H02J 3/46* (2013.01); *H02J 2300/28* (2020.01)

(58) Field of Classification Search
CPC ....... H02J 3/381; H02H 7/263; H02H 1/0092; G05B 17/02
See application file for complete search history.

(56) References Cited

FOREIGN PATENT DOCUMENTS

| CN | 106021682 A | * 10/2016 | ........... G06F 30/367 |
|---|---|---|---|
| CN | 106611957 | 5/2017 | |
| CN | 106655123 | 5/2017 | |

* cited by examiner

SYSTEM-LEVEL PROTECTION SYSTEM AND METHOD FOR SUB/SUPER-SYNCHRONOUS RESONANCE/OSCILLATION

CROSS-REFERENCE TO RELATED APPLICATIONS

This application is a continuation of International Patent Application No. PCT/CN2018/094238, filed on Jul. 3, 2018, which claims priority to Chinese Patent Application No. 201711108495.X, filed on Nov. 9, 2017. The entire disclosures of the aforementioned applications are incorporated herein by reference.

FIELD

The present disclosure relates to a field of power system protection technology, and more particularly, to a system-level protection system and method for sub/super-synchronous resonance/oscillation.

BACKGROUND

In recent years, a renewable energy power generation (such as a wind power generation, a photovoltaic power generation, and the like) has been rapidly developed. However, a problem of grid-connection of the renewable energy power generation has brought new challenges to a stable operation of a power system. For example, a sub/super-synchronous resonance/oscillation induced by interaction between a converter-based wind power generator and an alternating current power grid may cause large area of wind power generators to be de-energized, and even severely threaten a stable operation of a power equipment and a whole system.

SUMMARY

In a first aspect, embodiments of the present disclosure provide a system-level protection system for sub/super-synchronous resonance/oscillation. The system includes a centralized protection coordinator arranged in a control center and a plurality of distributed protection relays arranged in a plurality of transformer substations or a plurality of wind farms. Each of the plurality of distributed protection relays is configured to acquire a three-phase voltage and current at a port of each wind power generator in the wind farm, to process the three-phase voltage and current to acquire a sub/super-synchronous component in the voltage and current and calculate a sub/super-synchronous impedance, to transmit the sub/super-synchronous impedance to the centralized protection coordinator. The centralized protection coordinator is configured to receive the sub/super-synchronous impedances measured by the plurality of distributed protection relays, to obtain a sub/super-synchronous aggregate impedance of the system according to a preset circuit topology and the sub/super-synchronous impedances measured by the plurality of distributed protection relays, and to generate a system-level protection signal when the sub/super-synchronous aggregate impedance does not meet a stable condition. Each of the plurality of distributed protection relays is further configured to initiate a system-level protection according to the system-level protection signal.

In a second aspect, embodiments of the present disclosure provide a system-level protection method for sub/super-synchronous resonance/oscillation. The method is applied to a system including a plurality of wind farms, and includes: acquiring a three-phase voltage and current at a port of each wind power generator in the wind farm by a distributed protection relay arranged in the wind farm; processing the three-phase voltage and current to acquire a sub/super-synchronous component in the voltage and current and calculate a sub/super-synchronous impedance of the wind farm; obtaining a sub/super-synchronous aggregate impedance of the system according to a preset circuit topology and a plurality of sub/super-synchronous impedances of the wind farms, and generating a system-level protection signal when the sub/super-synchronous aggregate impedance does not meet a stable condition; and initiating a system-level protection by the distributed protection relay according to the system-level protection signal.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Reference will be made in detail to embodiments of the present disclosure. Embodiments of the present disclosure will be shown in drawings, in which the same or similar elements and the elements having same or similar functions are denoted by like reference numerals throughout the descriptions. Embodiments described herein with reference to drawings are explanatory, serve to explain the present disclosure, and are not construed to limit embodiments of the present disclosure.

A system-level protection system and method for sub/super-synchronous resonance/oscillation according to embodiments of the present disclosure will be described below with reference to the accompanying drawings.

Figure 1:
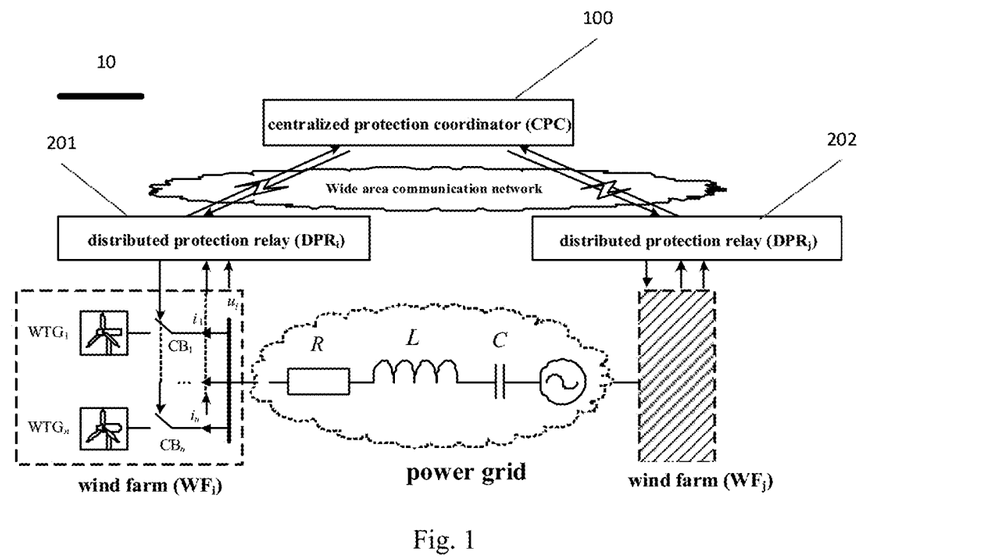
FIG. 1 is a schematic diagram of a system-level protection system for sub/super-synchronous resonance/oscillation according to embodiments of the present disclosure.

FIG. 1 is a schematic diagram of a sub/super-synchronous resonance/oscillation system-level protection system according to embodiments of the present disclosure.

As illustrated in FIG. 1, the system-level protection system 10 for sub/super-synchronous resonance/oscillation includes a centralized protection coordinator 100 and a plurality of distributed protection relays (such as a distributed protection relay 201 and a distributed protection relay 202).

The centralized protection coordinator 100 is arranged in a control center and the plurality of distributed protection relays are arranged in a plurality of transformer substation or wind farms. Each of the plurality of distributed protection relays may be configured to acquire a three-phase voltage and current at a corresponding device port to acquire a time domain waveform of the voltage and current, filter out a power frequency signal through a notch filter with a rated frequency, obtain a sub/super-synchronous signal through a modal filtering, obtain a sub/super-synchronous phasor of the voltage and current through a frequency domain transformation to acquire a sub/super-synchronous impedance, and trigger a local protection action when a sub/super-synchronous component is greater than a preset threshold or a system-level protection signal is received. The centralized protection coordinator 100 may be configured to acquire the sub/super-synchronous impedances measured by the plurality of distributed protection relays, to obtain a sub/super-synchronous aggregate impedance of the system according to a preset circuit topology, and to acquire an optimal generator tripping strategy to generate the system-level protection signal when the sub/super-synchronous aggregate impedance does not meet a stable condition.

The system 10 according to embodiments of the present disclosure may provide accurate, quick and reliable protection measures, so that a stability and a safety of the system are effectively improved, and a loss is reduced to a minimum.

Figure 2:
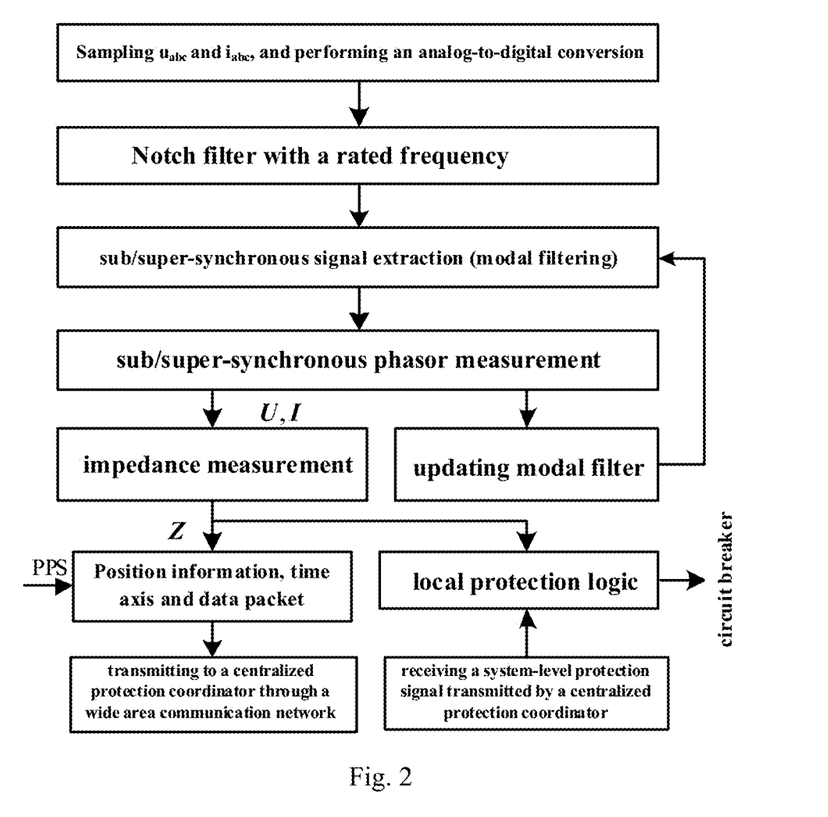
FIG. 2 is a flow chart of a system-level protection method implemented by a distributed protection relay according to an embodiment of the present disclosure.

It will be understood that, as illustrated in FIG. 2, the distributed protection relay according to embodiments of the present disclosure may first sample the three-phase voltage and current at the corresponding device port, and obtain the time domain waveform of the voltage and current through an analog-to-digital conversion. Then, by filtering out the power frequency signal (generally 50 Hz or 60 Hz) through notch filter with the rated frequency, and by the modal filtering, the corresponding sub/super-synchronous signal is obtained, thereby obtaining the sub/super-synchronous phasors $\dot{U}$ and $\dot{I}$ of the voltage and current through the frequency domain transformation (such as Discrete Fourier Transform (DFT)). When necessary, embodiments of the present disclosure may update the modal filtering to extract sub/super-synchronous signals for calculating phasors. Finally, the sub/super-synchronous impedance is calculated. With respect to a calculation method of the sub/super-synchronous impedance, reference may be made to the calculation method in the related art, which will not be elaborated here for reducing redundancy.

When the distributed protection relay detects the sub/super-synchronous component exceeding the threshold, the local protection action is triggered, and measured data is transmitted to the centralized protection coordinator 100. When the distributed protection relay receives the system-level protection signal from the centralized protection coordinator 100, a circuit breaker is controlled to be disconnected according to a protection logic, and the protection action is completed.

The centralized protection coordinator 100 according to embodiments of the present disclosure may receive data from each distributed protection relay, and calculate the sub/super synchronization aggregation impedance $Z_\Sigma = R_\Sigma jX_\Sigma$ of the whole system according to the known circuit topology. When the sub/super synchronization does not meet a stability requirement (i.e. $R_\Sigma < R_{th}$), the protection needs to be initiated. The centralized protection coordinator 100 may calculate the optimal generator tripping strategy and send the protection signal to the distributed protection relay.

Further, in an embodiment of the present disclosure, the centralized protection coordinator 100 is specifically configured to obtain the sub/super-synchronous impedance of the wind farm from each of the plurality of distributed protection relays, and obtain the sub/super-synchronous aggregate impedance of the system through an impedance calculation formula according to the sub/super-synchronous impedance of the wind farm, a sub/super-synchronous impedance of a power transmission line, a sub/super-synchronous impedance of a power grid, and the circuit topology. The impedance calculation formula is as follows:

$$\begin{cases} Z_{\Sigma(sub)} = Z_{\Sigma(sub)}\{Z_{Wi(sub)}, Z_{L(sub)}, Z_{G(sub)}\} = R_{\Sigma(sub)} + jX_{\Sigma(sub)} \\ Z_{\Sigma(sup)} = Z_{\Sigma(sup)}\{Z_{Wi(sup)}, Z_{L(sup)}, Z_{G(sup)}\} = R_{\Sigma(sup)} + jX_{\Sigma(sup)} \end{cases},$$

where, $Z_{Wi(sub)}/Z_{Wi(sup)}$, $Z_{L(sub)}/Z_{L(sup)}$, $Z_{G(sub)}/Z_{G(sup)}$ and $Z_{\Sigma(sub)}/X_{\Sigma(sup)}$ represent the sub/super-synchronous impedance of the wind farm, the sub/super-synchronous impedance of the power transmission line, the sub/super-synchronous impedance of the power grid, and respectively, and { } represents solving the sub/super-synchronous aggregate impedance according to the circuit topology.

Further, in an embodiment of the present disclosure, in response to $R_{\Sigma(sub)} < R_{th}$ or $R_{\Sigma(sup)} < R_{th}$, the protection action is triggered. Especially, the system-level protection signal is generated by: acquiring sensitivities respectively corresponding to a sub-synchronous oscillation mode and a super-synchronous oscillation mode that do not meet the stable condition; acquiring a set of candidate wind farms, in which the wind farm with a negative sub/super-synchronous resistance and a positive sensitivity is selected as the candidate wind farm, the sensitivity of the wind farm is calculated as a sum or a weighted sum of the sensitivities respectively corresponding to the sub-synchronous oscillation mode and the super-synchronous oscillation mode if the sensitivities respectively corresponding to the sub-synchronous oscillation mode and the super-synchronous oscillation mode are positive; allocating a weight to each candidate wind farm according to the sensitivities of the candidate wind farms; calculating a generator tripping ratio by forming an optimization problem with a constraint condition of a sub-synchronous and/or super-synchronous aggregate resistance after the generator tripping being not less than a stability margin; and acquiring a number of generators to be subjected to the generator tripping of the candidate wind farm, and transmitting the system-level protection signal formed by the number of generators to be subjected to the generator tripping of each candidate wind farm to the plurality of distributed protection relays.

In an embodiment of the present disclosure, the sensitivity is calculated by a formula of:

$$S_i = \frac{Re\{Z_\Sigma(n_i - \Delta n_{Ti}) - Z_\Sigma(n_i)\}}{\Delta n_{Ti}} \times 100\%,$$

where $n_i$ represents the number of wind power generators in the ith wind farm, $\Delta n_{Ti}$ represents the number of wind power generators to be subjected to the generator tripping in the ith wind farm, $Z_\Sigma(n_i)$ represents a value of the sub-synchronous and/or super-synchronous aggregate impedance of the ith wind farm before the generator tripping, $Z_\Sigma(n_i - \Delta n_{Ti})$ represents a value of the sub-synchronous and/or super-synchronous aggregate impedance of the ith wind farm after the generator tripping, and i represents a serial number of the wind farm.

In an embodiment of the present disclosure, the generator tripping ratio is solved by a formula of:

$$\min \alpha$$
$$\text{s.t.} \quad \alpha > 0;$$
$$Re\{Z_\Sigma(N_T)\} \geq R_{th}, N_T = \{\Delta n_{Ti}\},$$
$$\Delta n_{Ti} = \text{Round}\{\alpha \omega_i N_i\}, i \in I_T$$

where, Round represents rounding off to an integer, $\Delta n_{Ti}$ represents the number of the generators to be subjected to the generator tripping of the candidate wind farm, $N_T$ represents a set formed by the number of the generators to be subjected to the generator tripping of all candidate wind farms, $I_T$ represents the set of candidate wind farms, $Z_\Sigma(N_T)$ represents a value of the sub-synchronous and/or super-synchronous aggregate impedance of the system when the number of generators to be subjected to generator tripping is $N_T$, $R_{th}$ represents the stability margin indicated by a resistance, $\alpha$ represents the generator tripping ratio, $w_i$ represents a generator tripping weight of the ith wind farm, $N_i$ represents a total number of wind power generators of the ith wind farm.

Figure 3:
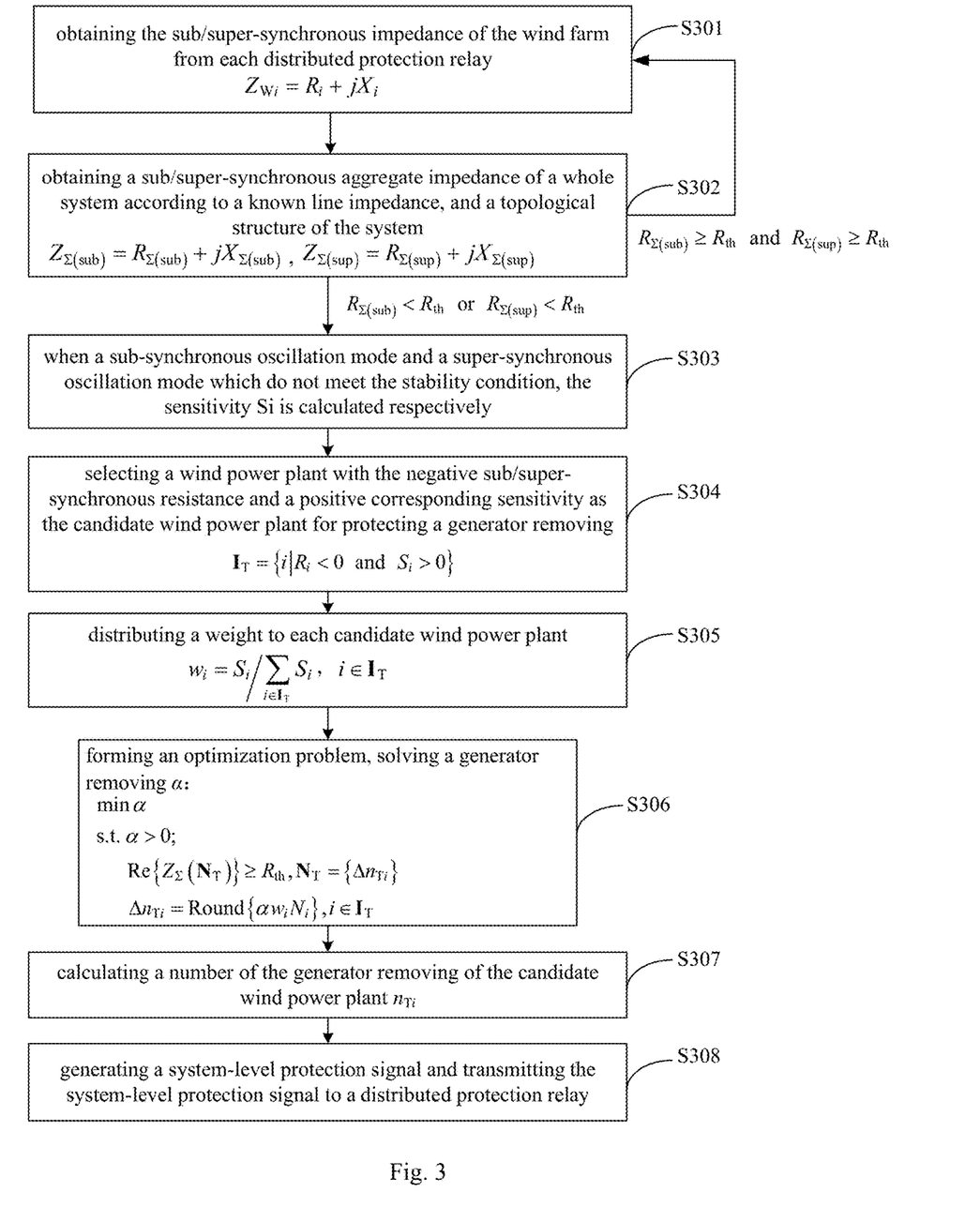
FIG. 3 is a flow chart of a system-level protection method implemented by a centralized protection coordinator according to an embodiment of the present disclosure.

It will be understood that, as illustrated in FIG. 3, a system-level protection method implemented by the centralized protection coordinator according to an embodiment of the present disclosure may include followings.

At block S301 and S302, the centralized protection coordinator 100 may obtain the impedance value of the wind farm from the each of the plurality of distributed protection relays, and calculate the sub/super-synchronous aggregate impedance $Z_{\Sigma(sub)}/Z_{\Sigma(sup)}$ of the whole system according to topological structure of the system in combination with the impedance of the line and the impedance of the power grid already know:

$$\begin{cases} Z_{\Sigma(sub)} = Z_{\Sigma(sub)}\{Z_{Wi(sub)}, Z_{L(sub)}, Z_{G(sub)}\} = R_{\Sigma(sub)} + jX_{\Sigma(sub)} \\ Z_{\Sigma(sup)} = Z_{\Sigma(sup)}\{Z_{Wi(sup)}, Z_{L(sup)}, Z_{G(sup)}\} = R_{\Sigma(sup)} + jX_{\Sigma(sup)} \end{cases} \quad (1)$$

where, $Z_{Wi(sub)}/Z_{Wi(sup)}$, $Z_{L(sub)}/Z_{L(sup)}$, $Z_{G(sub)}/Z_{G(sup)}$ and $Z_{\Sigma(sub)}/Z_{\Sigma(sup)}$ represent the sub/super-synchronous impedance of the wind farm, the sub/super-synchronous impedance of the power transmission line, the sub/super-synchronous impedance of the power grid, and respectively, and { } represents solving the sub/super-synchronous aggregate impedance according to the circuit topology.

In response to $R_{\Sigma(sub)} < R_{th}$ or $R_{\Sigma(sup)} < R_{th}$, the protection action is triggered and block S303 is executed.

At block S303, when a sub-synchronous oscillation mode and a super-synchronous oscillation mode may not meet the stability condition, a sensitivity $S_i$ is calculated respectively by a formula of:

$$S_i = \frac{Re\{Z_\Sigma(n_i - \Delta n_{Ti}) - Z_\Sigma(n_i)\}}{\Delta n_{Ti}} \times 100\%, \quad (2)$$

where, $n_i$ represents the number of wind power generators in the ith wind farm, $\Delta n_{Ti}$ represents the number of wind power generators to be subjected to the generator tripping in the ith wind farm, $Z_\Sigma(n_i)$ represents a value of the sub-synchronous and/or super-synchronous aggregate impedance of the ith wind farm before the generator tripping, $Z_\Sigma(n_i - \Delta n_{Ti})$ represents a value of the sub-synchronous and/or super-synchronous aggregate impedance of the ith wind farm after the generator tripping, and i represents a serial number of the wind farm.

Equation (2) is a method for calculating the sensitivity, and there are many methods for calculating the sensitivity, which is not limited here.

At block S304, the set $I_T$ of candidate wind farms is determined, in which the wind farm with the negative sub/super-synchronous resistance and the positive sensitivity is selected as the candidate wind farm:

$$I_T = \{i | R_i < 0 \text{ and } S_i > 0\} \quad (3).$$

If the sensitivities respectively corresponding to the sub-synchronous oscillation mode and the super-synchronous oscillation mode are positive, the sensitivity of the wind farm is calculated as a sum or a weighted sum of the sensitivities respectively corresponding to the sub-synchronous oscillation mode and the super-synchronous oscillation mode.

At block S305, a weight is allocated to each candidate weight farm according to the sensitivities. Specifically, the weight $w_i$ is allocated as follows:

$$w_i = \frac{S_i}{\sum_{i \in I_T} S_i}, i \in I_T. \quad (4)$$

At block S306, an optimization problem is formed by taking that the sub-synchronous and/or super-synchronous aggregate resistance $R_\Sigma$ after the generator tripping is not less than the stability margin $R_{th}$ as the constraint condition, and a generator tripping ratio $\alpha$ is solved from the optimization problem, which is specifically as follows:

$$\min \alpha \quad (5)$$
$$\text{s.t.} \quad \alpha > 0;$$
$$Re\{Z_\Sigma(N_T)\} \geq R_{th}, N_T = \{\Delta n_{Ti}\}$$
$$\Delta n_{Ti} = \text{Round}\{\alpha \omega_i N_i\}, i \in I_T,$$

where, Round represents rounding off to an integer.

At block S307, the number $\Delta n_{Ti}$ of generators to be subjected to generator tripping of the candidate wind farm is calculated.

At block S308, the system-level protection signal formed by the number $\Delta n_{Ti}$ of the generators to be subjected to generator tripping is transmitted to the plurality of distributed protection relays.

After the protection action is finished every time, whether the respective sub/super-synchronous aggregate resistance satisfies $R_\Sigma \geq R_{th}$ is detected. If $R_\Sigma \geq R_{th}$ is not satisfied, the protection algorithm is operated again, and the corresponding protection action is initiated. If $R_\Sigma \geq R_{th}$ is satisfied, the system is stable, and the protection action does not need to executed.

In a specific embodiment of the present disclosure, the system-level protection system for sub/super-synchronous resonance/oscillation according to embodiments of the present disclosure may be designed in the following way.

Firstly, the protection system is constructed.

The distributed protection relay is arranged in each transformer substation or each wind farm, and the distributed protection relay corresponding to each wind farm may control a circuit breaker at a port of each wind power generator in the wind farm to turn on or off. Moreover, one centralized protection coordinator 100 is established, and data transmission may be carried out between the distributed protection relay and the centralized protection coordinator 100 according to a preset protocol.

Secondly, data acquisition of the distributed protection relays and the calculation of the sub/super-synchronous aggregate impedance of the centralized protection coordinator 100 are performed.

The distributed protection relay acquires an output current and an output voltage at the port of each wind power generator in the wind farm, and data are processed (including filtering, frequency domain transformation and the like) to obtain the sub/super-synchronous component in the voltage and the current. Meanwhile, the sub/super-synchronous impedance of the wind farm is calculated, and acquired data (including time sequence) and the calculation result are transmitted to the centralized protection coordinator, and the measured sub/super-synchronous component is compared with the preset threshold. When the component is greater than the preset threshold, the local protection action is initiated.

The centralized protection coordinator 100 calculates the sub/super-synchronous aggregate impedance of the whole system according to the sub/super-synchronous impedance of each wind farm transmitted by the distributed protection relay, the known sub/super-synchronous impedance of the line, the sub/super-synchronous impedance of the power grid and the system topology.

Next, a sub/super-synchronous stability is judged.

When $R_\Sigma \geq R_{th}$, the protection action is not executed. When the sub/super-synchronous aggregate resistance $R_\Sigma$ calculated by the centralized protection coordinator is less than a preset stable threshold $R_{th}$, subsequent steps are carried out, i.e., the protection action is initiated.

Further, the calculation of a specific protection scheme is carried out.

The sensitivity $S_i$ of the sub/super-synchronous impedance of each wind farm to the number of wind power generators is calculated, and the set $I_T$ of candidate wind farms is determined according to the formula (3), and the number of wind power generators required to be subjected to the generator tripping in each candidate wind farm is determined according to the formula (4).

Finally, the wind power generator is specified to be subjected to the generator tripping.

The centralized protection coordinator 100 generates the system-level protection signal according to the calculation result of the specific protection scheme and transmits the system-level protection signal to each distributed protection relay. Each distributed protection relay controls corresponding number of circuit breakers of the wind power generators to be disconnected according to the system-level protection signal, so that the corresponding number of wind power generators are removed from the system.

With the system-level protection system for sub/super-synchronous resonance/oscillation according to embodiments of the present disclosure, the number of the wind power generators required to be removed in different wind farms is determined by calculating the sensitivity of the aggregate impedance of the whole system for the number of the wind power generators in different wind farms, which eliminates the sub/super-synchronous resonance/oscillation of the system eliminated, and provides an accurate, quick and reliable protection method, so that the number of the generators to be removed is minimized while ensuring the stability of the system, the loss is minimized, the safety and the reliability of the system are effectively improved, and the stability of the system is better ensured.

In the following, the system-level protection method for sub/super-synchronous resonance/oscillation will be described below with reference to the accompanying drawings.

Figure 4:
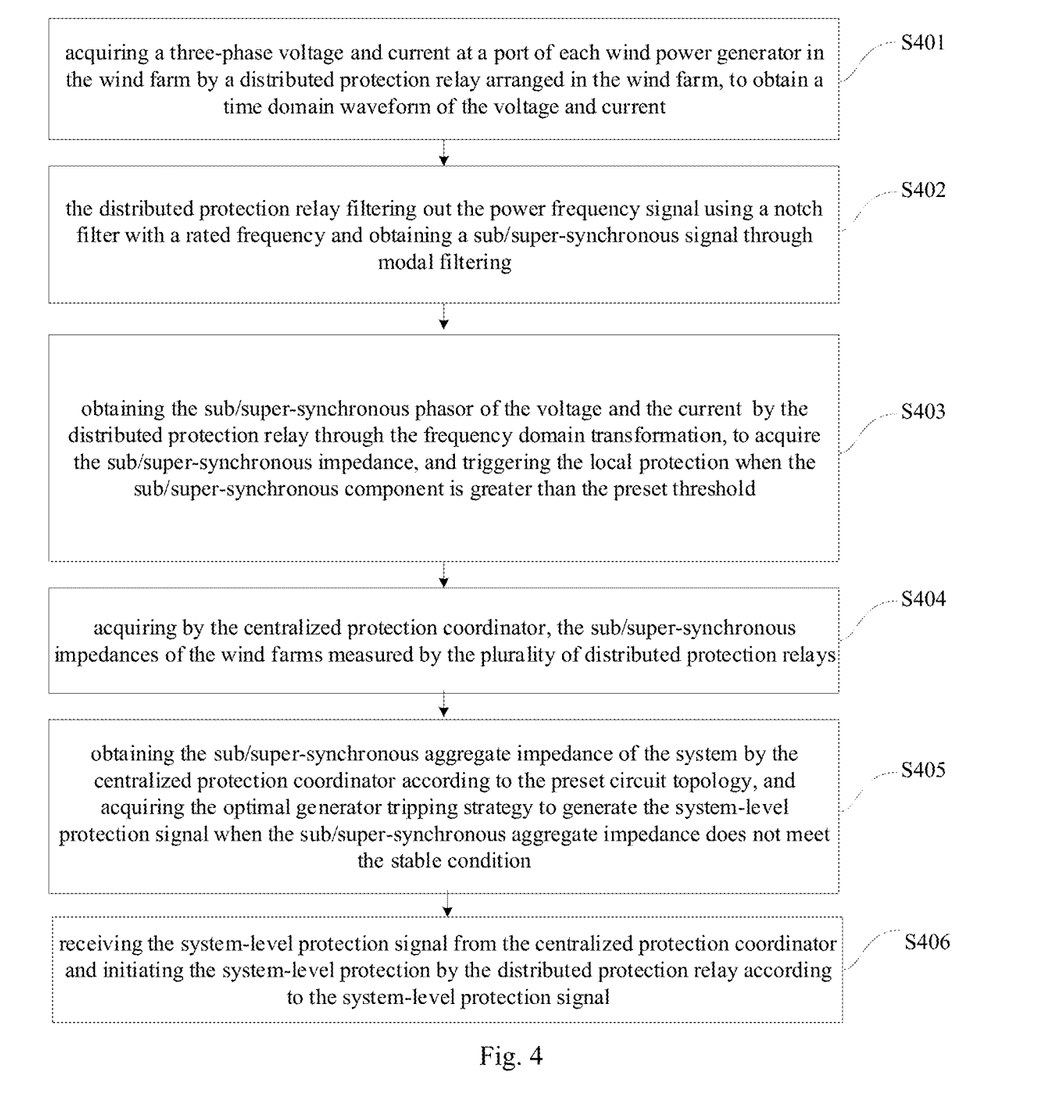
FIG. 4 is a flow chart of a system-level protection method for sub/super-synchronous resonance/oscillation according to embodiments of the present disclosure.

FIG. 4 is a flow chart of a system-level protection method for sub/super-synchronous resonance/oscillation according to embodiments of the present disclosure.

As illustrated in FIG. 4, the method includes followings.

At block S401, a three-phase voltage and current at a port of each wind power generator in the wind farm is acquired by a distributed protection relay arranged in the wind farm, to obtain a time domain waveform of the voltage and current.

At block S402, the distributed protection relay filters out the power frequency signal using a notch filter with a rated frequency and obtains a sub/super-synchronous signal through modal filtering.

At block S403, the sub/super-synchronous phasor of the voltage and the current is obtained by the distributed protection relay through the frequency domain transformation, to acquire the sub/super-synchronous impedance, and the local protection is triggered when the sub/super-synchronous component is greater than the preset threshold.

In embodiments of the present disclosure, if there is no communication network among the centralized protection coordinator and the distributed protection relays, it is possible to initiate the local protection when the sub/super-synchronous component is greater than the preset threshold.

At block S404, the sub/super-synchronous impedances of the wind farms measured by the plurality of distributed protection relays are acquired by the centralized protection coordinator.

At block S405, the sub/super-synchronous aggregate impedance of the system is obtained by the centralized protection coordinator according to the preset circuit topology, and the optimal generator tripping strategy is acquired to generate the system-level protection signal when the sub/super-synchronous aggregate impedance does not meet the stable condition.

At block S406, the system-level protection signal is received from the centralized protection coordinator and the system-level protection is initiated by the distributed protection relay according to the system-level protection signal.

Further, in an embodiment of the present disclosure, obtaining the sub/super-synchronous aggregate impedance of the system according to the preset circuit topology and the plurality of sub/super-synchronous impedances of the wind farms includes: obtaining the sub/super-synchronous aggregate impedance of the system through an impedance calculation formula according to the sub/super-synchronous impedance of the wind farm, a sub/super-synchronous impedance of a power transmission line, a sub/super-synchronous impedance of a power grid, and the circuit topology, the impedance calculation formula being:

$$\begin{cases} Z_{\Sigma(sub)} = Z_{\Sigma(sub)}\{Z_{Wi(sub)}, Z_{L(sub)}, Z_{G(sub)}\} = R_{\Sigma(sub)} + jX_{\Sigma(sub)} \\ Z_{\Sigma(sup)} = Z_{\Sigma(sup)}\{Z_{Wi(sup)}, Z_{L(sup)}, Z_{G(sup)}\} = R_{\Sigma(sup)} + jX_{\Sigma(sup)} \end{cases},$$

where, $Z_{Wi(sub)}/Z_{Wi(sup)}$, $Z_{L(sub)}/Z_{L(sup)}$, $Z_{G(sub)}/Z_{G(sup)}$ and $Z_{\Sigma(sub)}/Z_{\Sigma(sup)}$ represent the sub/super-synchronous impedance of the wind farm, the sub/super-synchronous impedance of the power transmission line, the sub/super-synchronous impedance of the power grid, and respectively, and { } represents solving the sub/super-synchronous aggregate impedance according to the circuit topology.

Further, in an embodiment of the present disclosure, in response to $R_{\Sigma(sub)} < R_{th}$ or $R_{\Sigma(sup)} < R_{th}$, the system-level protection signal is generated.

Further, generating the system-level protection signal includes: acquiring sensitivities respectively corresponding to a sub-synchronous oscillation mode and a super-synchronous oscillation mode that do not meet the stable condition; acquiring a set of candidate wind farms, in which the wind farm with a negative sub/super-synchronous resistance and a positive sensitivity is selected as the candidate wind farm, the sensitivity of the wind farm is calculated as a sum or a weighted sum of the sensitivities respectively corresponding to the sub-synchronous oscillation mode and the super-synchronous oscillation mode if the sensitivities respectively corresponding to the sub-synchronous oscillation mode and the super-synchronous oscillation mode are positive; allocating a weight to each candidate wind farm according to the sensitivities of the candidate wind farms; calculating a generator tripping ratio by forming an optimization problem with a constraint condition of a sub-synchronous and/or super-synchronous aggregate resistance after the generator tripping being not less than a stability margin; and acquiring a number of generators to be subjected to the generator tripping of the candidate wind farm, and generating the system-level protection signal formed by the number of generators to be subjected to the generator tripping of each candidate wind farm.

Further, in an embodiment of the present disclosure, the sensitivity is calculated by a formula of:

$$S_i = \frac{Re\{Z_\Sigma(n_i - \Delta n_{Ti}) - Z_\Sigma(n_i)\}}{\Delta n_{Ti}} \times 100\%,$$

where, $n_i$ represents the number of wind power generators in the ith wind farm, $\Delta n_{Ti}$ represents the number of wind power generators to be subjected to the generator tripping in the ith wind farm, $Z_\Sigma(n_i)$ represents a value of the sub-synchronous and/or super-synchronous aggregate impedance of the ith wind farm before the generator tripping, $Z_\Sigma(n_i - \Delta n_{Ti})$ represents a value of the sub-synchronous and/or super-synchronous aggregate impedance of the ith wind farm after the generator tripping, and i represents a serial number of the wind farm.

Further, in an embodiment of the present disclosure, the generator tripping ratio is solved by a formula of:

$$\min \alpha$$
$$\text{s.t. } \alpha > 0;$$
$$Re\{Z_\Sigma(N_T)\} \geq R_{th}, N_T = \{\Delta n_{Ti}\},$$
$$\Delta n_{Ti} = \text{Round}\{\alpha \omega_i N_i\}, i \in I_T$$

where, Round represents rounding off to an integer, $\Delta n_{Ti}$ represents the number of the generators to be subjected to the generator tripping of the candidate wind farm, $N_T$ represents a set formed by the number of the generators to be subjected to the generator tripping of all candidate wind farms, $I_T$ represents the set of candidate wind farms, $Z_\Sigma(N_T)$ represents a value of the sub-synchronous and/or super-synchronous aggregate impedance of the system when the number of generators to be subjected to generator tripping is $N_T$, $R_{th}$ represents the stability margin indicated by a resistance, $\alpha$ represents the generator tripping ratio, $w_i$ represents a generator tripping weight of the ith wind farm, $N_i$ represents a total number of wind power generators of the ith wind farm.

It should be noted that the above explanation of embodiments of the system-level protection system for sub/super-synchronous resonance/oscillation is also applicable to embodiments of the system-level protection method for sub/super-synchronous resonance/oscillation, which is not elaborated here.

With the system-level protection method for sub/super-synchronous resonance/oscillation according to embodiments of the present disclosure, the number of the wind power generators required to be removed in different wind farms is determined by calculating the sensitivity of the aggregate impedance of the whole system for the number of the wind power generators in different wind farms, which eliminates the sub/super-synchronous resonance/oscillation of the system eliminated, and provides an accurate, quick and reliable protection method, so that the number of the generators to be removed is minimized while ensuring the stability of the system, the loss is minimized, the safety and the reliability of the system are effectively improved, and the stability of the system is better ensured.

In the description of the present invention, it should to be understood that the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc., indicate an orientation or a positional relationship based on the drawings, are merely for convenience of description and simplification of the description, and do not indicate or imply that the device or element referred to must have a particular orientation, be constructed in a particular orientation, and be operated, and therefore should not be construed as limiting the present disclosure.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example, two or three, unless specified otherwise.

Unless otherwise stipulated and restricted, it is to be explained that terms of "installation", "linkage" and "connection" shall be understood broadly, for example, it could be permanent connection, removable connection or integral connection; it could be direct linkage, indirect linkage or inside linkage within two elements. Those skilled in the art shall understand the concrete notations of the terms mentioned above according to specific circumstances.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature. A first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Although embodiments of present disclosure have been shown and described above, it should be understood that above embodiments are just explanatory, and cannot be construed to limit the present disclosure, for those skilled in the art, changes, modifications, alternations, and variations can be made to the embodiments within the scope of the present disclosure.

What is claimed is:

1. A system-level protection system for sub/super-synchronous resonance/oscillation, comprising a centralized protection coordinator arranged in a control center and a plurality of distributed protection relays arranged in a plurality of transformer substations or a plurality of wind farms, wherein,
    each of the plurality of distributed protection relays is configured to acquire a three-phase voltage and current at a port of each wind power generator in the wind farm, to process the three-phase voltage and current to acquire a sub/super-synchronous component in the voltage and current and calculate a sub/super-synchronous impedance, to transmit the sub/super-synchronous impedance to the centralized protection coordinator;
    the centralized protection coordinator is configured to receive the sub/super-synchronous impedances measured by the plurality of distributed protection relays, to obtain a sub/super-synchronous aggregate impedance of the system according to a preset circuit topology and the sub/super-synchronous impedances measured by the plurality of distributed protection relays, and to generate a system-level protection signal when the sub/super-synchronous aggregate impedance does not meet a stable condition; and
    each of the plurality of distributed protection relays is further configured to initiate a system-level protection according to the system-level protection signal;
    wherein the centralized protection coordinator is specifically configured to obtain the sub/super-synchronous impedance of the wind farm from each of the plurality of distributed protection relays, and obtain the sub/super-synchronous aggregate impedance of the system through an impedance calculation formula according to the sub/super-synchronous impedance of the wind farm, a sub/super-synchronous impedance of a power transmission line, a sub/super-synchronous impedance of a power grid, and the circuit topology, the impedance calculation formula being:

$$\begin{cases} Z_{\Sigma(sub)} = Z_{\Sigma(sub)}\{Z_{Wi(sub)}, Z_{L(sub)}, Z_{G(sub)}\} = R_{\Sigma(sub)} + jX_{\Sigma(sub)} \\ Z_{\Sigma(sup)} = Z_{\Sigma(sup)}\{Z_{Wi(sup)}, Z_{L(sup)}, Z_{G(sup)}\} = R_{\Sigma(sup)} + jX_{\Sigma(sup)} \end{cases},$$

where, where, $Z_{Wi(sub)}/Z_{Wi(sup)}$, $Z_{L(sub)}/Z_{L(sup)}$, $Z_{G(sub)}/Z_{G(sup)}$ and $Z_{\Sigma(sub)}/X_{\Sigma(sup)}$ represent the sub/super-synchronous impedance of the wind farm, the sub/super-synchronous impedance of the power transmission line, the sub/super-synchronous impedance of the power grid, and respectively, and { } represents solving the sub/super-synchronous aggregate impedance according to the circuit topology;
    wherein, the centralized protection coordinator is configured to generate the system-level protection signal in response to $R_{\Sigma(sub)}<R_{th}$ or $R_{\Sigma(sup)}<R_{th}$;
    wherein the centralized protection coordinator is configured to:
        acquire sensitivities respectively corresponding to a sub-synchronous oscillation mode and a super-synchronous oscillation mode that do not meet the stable condition;
        acquire a set of candidate wind farms, in which the wind farm with a negative sub/super-synchronous resistance and a positive sensitivity is selected as the candidate wind farm, the sensitivity of the wind farm is calculated as a sum or a weighted sum of the sensitivities respectively corresponding to the sub-synchronous oscillation mode and the super-synchronous oscillation mode if the sensitivities respectively corresponding to the sub-synchronous oscillation mode and the super-synchronous oscillation mode are positive;
        allocate a weight to each candidate wind farm according to the sensitivities of the candidate wind farms;
        calculate a generator tripping ratio by forming an optimization problem with a constraint condition of a sub-synchronous and/or super-synchronous aggregate resistance after the generator tripping being not less than a stability margin; and
        acquire a number of generators to be subjected to the generator tripping of the candidate wind farm, and transmit the system-level protection signal formed by the number of generators to be subjected to the generator tripping of each candidate wind farm to the plurality of distributed protection relays.

2. The system of claim 1, wherein each of the plurality of distributed protection relays is configured to process the three-phase voltage and current by filtering out power frequency signals, modal modeling, and frequency domain transformation.

3. The system of claim 1, wherein the sensitivity is calculated by a formula of:

$$S_i = \frac{Re\{Z_\Sigma(n_i - \Delta n_{Ti}) - Z_\Sigma(n_i)\}}{\Delta n_{Ti}} \times 100\%,$$

where $n_i$ represents the number of wind power generators in the ith wind farm, $\Delta n_{Ti}$ represents the number of wind power generators to be subjected to the generator tripping in the ith wind farm, $Z_\Sigma(n_i)$ represents a value of the sub-synchronous and/or super-synchronous aggregate impedance of the ith wind farm before the generator tripping, $Z_\Sigma(n_i-\Delta n_{Ti})$ represents a value of the sub-synchronous and/or super-synchronous aggregate impedance of the ith wind farm after the generator tripping, and i represents a serial number of the wind farm.

4. The system of claim 1, wherein the generator tripping ratio is solved by a formula of:

$$\min \alpha$$
$$\text{s.t. } \alpha > 0;$$
$$Re\{Z_\Sigma(N_T)\} \geq R_{th}, N_T = \{\Delta n_{Ti}\},$$
$$\Delta n_{Ti} = \text{Round}\{\alpha \omega_i N_i\}, i \in I_T$$

where, Round represents rounding off to an integer, $\Delta n_{Ti}$ represents the number of the generators to be subjected to the generator tripping of the candidate wind farm, $N_T$ represents a set formed by the number of the generators to be subjected to the generator tripping of all candidate wind farms, $I_T$ represents the set of candidate wind farms, $Z_\Sigma(N_T)$ represents a value of the sub-synchronous and/or super-synchronous aggregate impedance of the system when the number of generators to be subjected to generator tripping is $N_T$, $R_{th}$ represents the stability margin indicated by a resistance, $\alpha$ represents the generator tripping ratio, $w_i$ represents a generator tripping weight of the ith wind farm, $N_i$ represents a total number of wind power generators of the ith wind farm.

5. The system of claim 1, wherein each of the plurality of distributed protection relays is further configured to initiate a local protection when the sub/super-synchronous component is greater than a preset threshold.

6. A system-level protection method for sub/super-synchronous resonance/oscillation, applied to a system comprising a plurality of wind farms, comprising:
   acquiring a three-phase voltage and current at a port of each wind power generator in the wind farm by a distributed protection relay arranged in the wind farm;
   processing the three-phase voltage and current to acquire a sub/super-synchronous component in the voltage and current and calculate a sub/super-synchronous impedance of the wind farm;
   obtaining a sub/super-synchronous aggregate impedance of the system according to a preset circuit topology and a plurality of sub/super-synchronous impedances of the wind farms, and generating a system-level protection signal when the sub/super-synchronous aggregate impedance does not meet a stable condition; and
   initiating a system-level protection by the distributed protection relay according to the system-level protection signal;
   wherein obtaining the sub/super-synchronous aggregate impedance of the system according to the preset circuit topology and the plurality of sub/super-synchronous impedances of the wind farms comprises:
   obtaining the sub/super-synchronous aggregate impedance of the system through an impedance calculation formula according to the sub/super-synchronous impedance of the wind farm, a sub/super-synchronous impedance of a power transmission line, a sub/super-synchronous impedance of a power grid, and the circuit topology, the impedance calculation formula being:

$$\begin{cases} Z_{\Sigma(sub)} = Z_{\Sigma(sub)}\{Z_{Wi(sub)}, Z_{L(sub)}, Z_{G(sub)}\} = R_{\Sigma(sub)} + jX_{\Sigma(sub)} \\ Z_{\Sigma(sup)} = Z_{\Sigma(sup)}\{Z_{Wi(sup)}, Z_{L(sup)}, Z_{G(sup)}\} = R_{\Sigma(sup)} + jX_{\Sigma(sup)} \end{cases},$$

where, $Z_{Wi(sub)}/Z_{Wi(sup)}$, $Z_{L(sub)}/Z_{L(sup)}$, $Z_{G(sub)}/Z_{G(sup)}$ and $Z_{\Sigma(sub)}/X_{\Sigma(sup)}$ represent the sub/super-synchronous impedance of the wind farm, the sub/super-synchronous impedance of the power transmission line, the sub/super-synchronous impedance of the power grid, and respectively, and { } represents solving the sub/super-synchronous aggregate impedance according to the circuit topology;
wherein, the system-level protection signal is generated in response to $R_{\Sigma(sub)} < R_{th}$ or $R_{\Sigma(sup)} < R_{th}$;
wherein generating the system-level protection signal comprises:
   acquiring sensitivities respectively corresponding to a sub-synchronous oscillation mode and a super-synchronous oscillation mode that do not meet the stable condition;
   acquiring a set of candidate wind farms, in which the wind farm with a negative sub/super-synchronous resistance and a positive sensitivity is selected as the candidate wind farm, the sensitivity of the wind farm is calculated as a sum or a weighted sum of the sensitivities respectively corresponding to the sub-synchronous oscillation mode and the super-synchronous oscillation mode if the sensitivities respectively corresponding to the sub-synchronous oscillation mode and the super-synchronous oscillation mode are positive;
   allocating a weight to each candidate wind farm according to the sensitivities of the candidate wind farms;
   calculating a generator tripping ratio by forming an optimization problem with a constraint condition of a sub-synchronous and/or super-synchronous aggregate resistance after the generator tripping being not less than a stability margin; and
   acquiring a number of generators to be subjected to the generator tripping of the candidate wind farm, and generating the system-level protection signal formed by the number of generators to be subjected to the generator tripping of each candidate wind farm.

7. The method of claim 6, wherein processing the three-phase voltage and current comprises filtering out power frequency signals, modal modeling, and frequency domain transformation.

8. The method of claim 6, wherein the sensitivity is calculated by a formula of:

$$S_i = \frac{Re\{Z_\Sigma(n_i - \Delta n_{Ti}) - Z_\Sigma(n_i)\}}{\Delta n_{Ti}} \times 100\%,$$

where $n_i$ represents the number of wind power generators in the ith wind farm, $\Delta n_{Ti}$ represents the number of wind power generators to be subjected to the generator tripping in the ith wind farm, $Z_\Sigma(n_i)$ represents a value of the sub-synchronous and/or super-synchronous aggregate impedance of the ith wind farm before the generator tripping, $Z_\Sigma(n_i-\Delta n_{Ti})$ represents a value of the sub-synchronous and/or super-synchronous aggregate impedance of the ith wind farm after the generator tripping, and i represents a serial number of the wind farm.

9. The method of claim 6, wherein the generator tripping ratio is solved by a formula of:

$$\min \alpha$$
$$\text{s.t. } \alpha > 0;$$
$$Re\{Z_\Sigma(N_T)\} \geq R_{th}, N_T = \{\Delta n_{Ti}\},$$
$$\Delta n_{Ti} = \text{Round}\{\alpha \omega_i N_i\}, i \in I_T$$

where, Round represents rounding off to an integer, $\Delta n_{Ti}$ represents the number of the generators to be subjected to the generator tripping of the candidate wind farm, $N_T$ represents a set formed by the number of the generators to be subjected to the generator tripping of all candidate wind farms, $I_T$ represents the set of candidate wind farms, $Z_\Sigma(N_T)$ represents a value of the sub-synchronous and/or super-synchronous aggregate impedance of the system when the number of generators to be subjected to generator tripping is $N_T$, $R_{th}$ represents the stability margin indicated by a resistance, $\alpha$ represents the generator tripping ratio, $w_i$ represents a generator tripping weight of the ith wind farm, $N_i$ represents a total number of wind power generators of the ith wind farm.

10. The method of claim 6, further comprising:
initiating a local protection when the sub/super-synchronous component is greater than a preset threshold.

* * * * *